US010740362B2

(12) United States Patent
Agrawal et al.

(10) Patent No.: US 10,740,362 B2
(45) Date of Patent: Aug. 11, 2020

(54) CONTAINER STRUCTURE

(71) Applicant: INTERNATIONAL BUSINESS MACHINES CORPORATION, Armonk, NY (US)

(72) Inventors: Anmol Sandeep Agrawal, Bangalore (IN); Albee Jhoney, Bangalore (IN); Suman Mondal, Burdwan (IN); Pothuraju Srinivas, Bangalore (IN); Vijay K. Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 15/851,808

(22) Filed: Dec. 22, 2017

(65) Prior Publication Data

US 2019/0197178 A1    Jun. 27, 2019

(51) Int. Cl.
*G06F 17/00* (2019.01)
*G06F 16/28* (2019.01)
*G06F 16/22* (2019.01)

(52) U.S. Cl.
CPC .......... *G06F 16/285* (2019.01); *G06F 16/221* (2019.01)

(58) Field of Classification Search
CPC .............................. G06F 16/285; G06F 16/221
See application file for complete search history.

(56) References Cited

U.S. PATENT DOCUMENTS

| | | | | |
|---|---|---|---|---|
| 6,629,150 B1 * | 9/2003 | Huded | .................... | G06F 21/64 |
| | | | | 707/999.004 |
| 8,024,733 B2 * | 9/2011 | Hambrick | ............... | G06F 9/485 |
| | | | | 718/101 |
| 9,239,730 B2 * | 1/2016 | Mizrahi | .............. | G06F 9/45558 |
| 9,501,304 B1 * | 11/2016 | Powers | .................... | H04L 67/34 |
| 9,602,536 B1 * | 3/2017 | Brown, Jr. | .......... | H04L 63/1491 |
| 9,766,945 B2 * | 9/2017 | Gaurav | ................. | G06F 9/5077 |
| 10,002,247 B2 * | 6/2018 | Suarez | .................... | G06F 21/31 |

(Continued)

FOREIGN PATENT DOCUMENTS

EP    3522013 A1 *  8/2019 ........... G06F 9/4856

OTHER PUBLICATIONS

Microsoft Windows Server. "Virtual machine sizing guidance" <https://docs.microsoft.com/en-us/windows-server/remote/remote-desktop-services/virtual-machine-recs>. 2019. (Year: 2019).*

(Continued)

*Primary Examiner* — Syed H Hasan
(74) *Attorney, Agent, or Firm* — Patrick J. Daugherty; Daugherty & Del Zoppo Co., L.P.A.

(57) ABSTRACT

Aspects generating a container structure wherein processors are configured to compare attributes of a new container to attributes of each of plurality of existing containers within a container model as a function of a weighted Jaccard co-efficient distance matrix. The aspects identify a neighbor subset of the model containers that each have attributes that are nearest to the new container attributes, relative to remaining others of the model containers; select, as a nearest container, a container of the neighbor subset that has closest matching statistical properties to statistical properties calculated for the new container attributes; and generate a sizing recommendation for the new container to meet future utilization needs predicted as a function of usage pattern data of the nearest container.

20 Claims, 5 Drawing Sheets

(56) References Cited

U.S. PATENT DOCUMENTS

| | | | |
|---|---|---|---|
| 10,032,032 B2* | 7/2018 | Suarez | G06F 21/562 |
| 10,127,030 B1* | 11/2018 | Mortman | G06F 8/64 |
| 10,140,159 B1* | 11/2018 | Thomason | G06F 9/455 |
| 10,210,024 B2* | 2/2019 | Bhimani | G06F 9/5083 |
| 10,261,782 B2* | 4/2019 | Suarez | G06F 9/45558 |
| 10,270,841 B1* | 4/2019 | Thomason | H04L 67/142 |
| 10,289,457 B1* | 5/2019 | Slawomir | G06F 9/54 |
| 10,389,598 B2* | 8/2019 | Padala | H04L 41/0803 |
| 10,430,249 B2* | 10/2019 | Kaul | G06F 9/45558 |
| 10,460,113 B2* | 10/2019 | Folco | G06F 21/53 |
| 2008/0028145 A1* | 1/2008 | Lecomte | G06F 3/0614 |
| | | | 711/114 |
| 2010/0064299 A1* | 3/2010 | Kacin | G06F 9/45537 |
| | | | 719/317 |
| 2013/0326507 A1* | 12/2013 | McGrath | G06F 9/4856 |
| | | | 718/1 |
| 2014/0059229 A1* | 2/2014 | Parikh | G06F 11/3065 |
| | | | 709/226 |
| 2015/0172102 A1* | 6/2015 | DeCusatis | H04L 45/28 |
| | | | 370/218 |
| 2016/0182315 A1* | 6/2016 | Salokanto | H04L 41/5054 |
| | | | 709/226 |
| 2016/0378518 A1* | 12/2016 | Antony | G06F 9/45533 |
| | | | 718/1 |
| 2016/0378564 A1 | 12/2016 | Gaurav et al. | |
| 2016/0381075 A1* | 12/2016 | Goyal | H04L 63/20 |
| | | | 713/176 |
| 2017/0034023 A1 | 2/2017 | Nickolov et al. | |
| 2017/0060609 A1 | 3/2017 | Cropper et al. | |
| 2017/0199770 A1* | 7/2017 | Peteva | G06F 9/5088 |
| 2019/0116237 A1* | 4/2019 | Gibson | H04L 67/2833 |

OTHER PUBLICATIONS

Q. Zhang, L. Liu, C. Pu, Q. Dou, L. Wu and W. Zhou, "A Comparative Study of Containers and Virtual Machines in Big Data Environment," 2018 IEEE 11th International Conference on Cloud Computing (CLOUD), San Francisco, CA, 2018, pp. 178-185. (Year: 2018).*

Peter Mell et al, The NIST Definition of Cloud Computing, National Institute of Standards and Technology, Publication 800-145, 2011, entire document.

Authors Not Disclosed, A Comparison of Techniques to Detect Similarities in Cloud Virtual Machines, Int. J. Signal and Imaging Systems Engineering, Inderscience Enterprises Ltd., 2012, pp. 1-11.

* cited by examiner

CONTAINER STRUCTURE

BACKGROUND

A container is a data structure that envelops ("wraps") wraps a piece of software (or a component of an application) in a complete filesystem that contains everything needed to run: code, runtime, system tools, system libraries, generally anything that can be installed on a server. The container is intended to contain enough information to ensure that the contained software or application will always run the same, regardless of its environment.

SUMMARY

In one aspect of the present invention, a computerized method for generating a container structure includes executing steps on a computer processor. Thus, a computer processor is configured to, in response to an input of attributes of a new container that includes application, workload and usage characteristics, compare the input to attributes of each of plurality of existing containers within a container model as a function of a weighted Jaccard coefficient distance matrix. The configured processor identifies a neighbor subset of the model containers that each have attributes that are nearest to the input attributes, relative to remaining others of the model containers; selects, as a nearest container, a container of the neighbor subset that has closest matching statistical properties to statistical properties calculated for the input attributes, relative to remaining others of the neighbor subset; and generates a sizing recommendation for the new container to meet future utilization needs predicted as a function of usage pattern data of the nearest container.

In another aspect, a system has a hardware processor in circuit communication with a computer-readable memory and a computer-readable storage medium having program instructions stored thereon. The processor executes the program instructions stored on the computer-readable storage medium via the computer-readable memory and is thereby configured to, in response to an input of attributes of a new container that includes application, workload and usage characteristics, compare the input to attributes of each of plurality of existing containers within a container model as a function of a weighted Jaccard co-efficient distance matrix. The configured processor identifies a neighbor subset of the model containers that each have attributes that are nearest to the input attributes, relative to remaining others of the model containers; selects, as a nearest container, a container of the neighbor subset that has closest matching statistical properties to statistical properties calculated for the input attributes, relative to remaining others of the neighbor subset; and generates a sizing recommendation for the new container to meet future utilization needs predicted as a function of usage pattern data of the nearest container.

In another aspect, a computer program product for generating a container structure has a computer-readable storage medium with computer-readable program code embodied therewith. The computer-readable hardware medium is not a transitory signal per se. The computer-readable program code includes instructions for execution which cause the processor to, in response to an input of attributes of a new container that includes application, workload and usage characteristics, compare the input to attributes of each of plurality of existing containers within a container model as a function of a weighted Jaccard co-efficient distance matrix. The processor is caused to identify a neighbor subset of the model containers that each have attributes that are nearest to the input attributes, relative to remaining others of the model containers; select, as a nearest container, a container of the neighbor subset that has closest matching statistical properties to statistical properties calculated for the input attributes, relative to remaining others of the neighbor subset; and generate a sizing recommendation for the new container to meet future utilization needs predicted as a function of usage pattern data of the nearest container.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
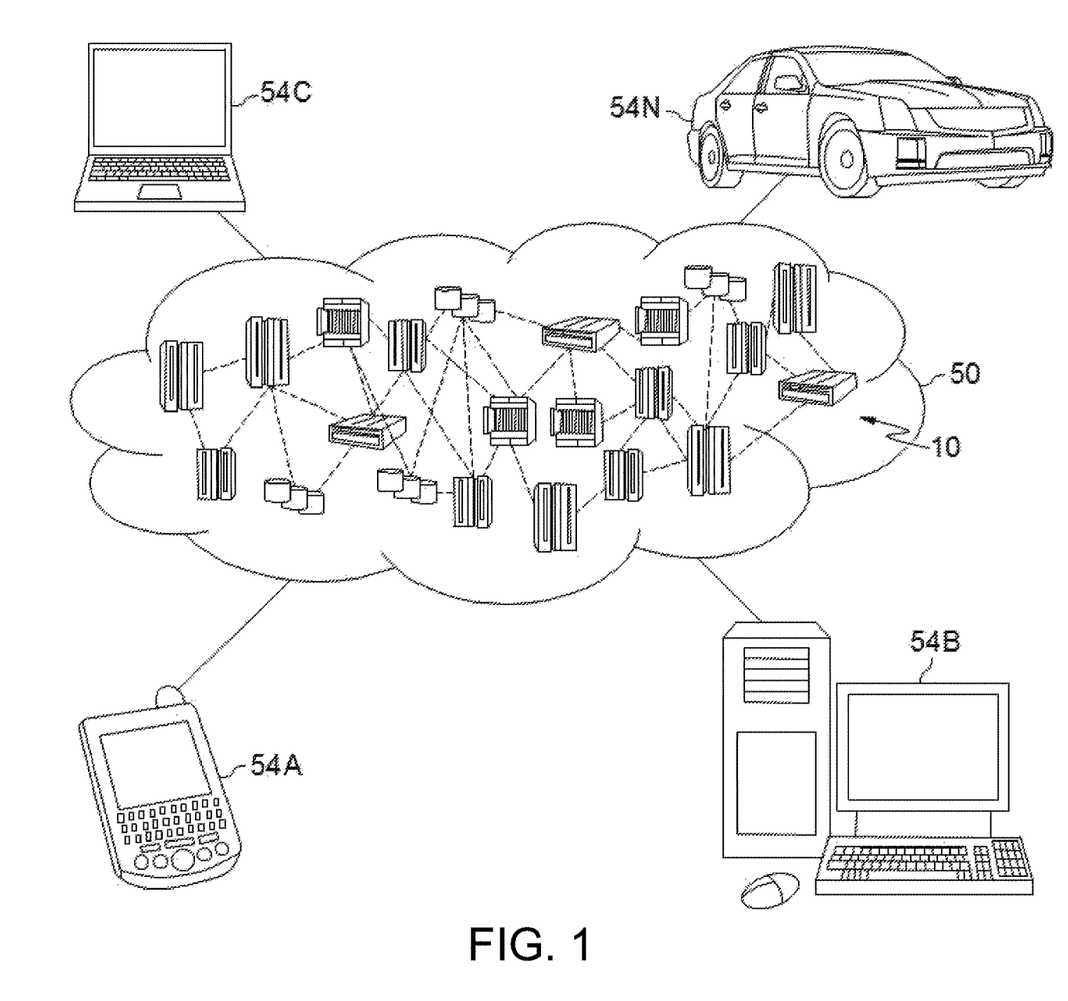
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
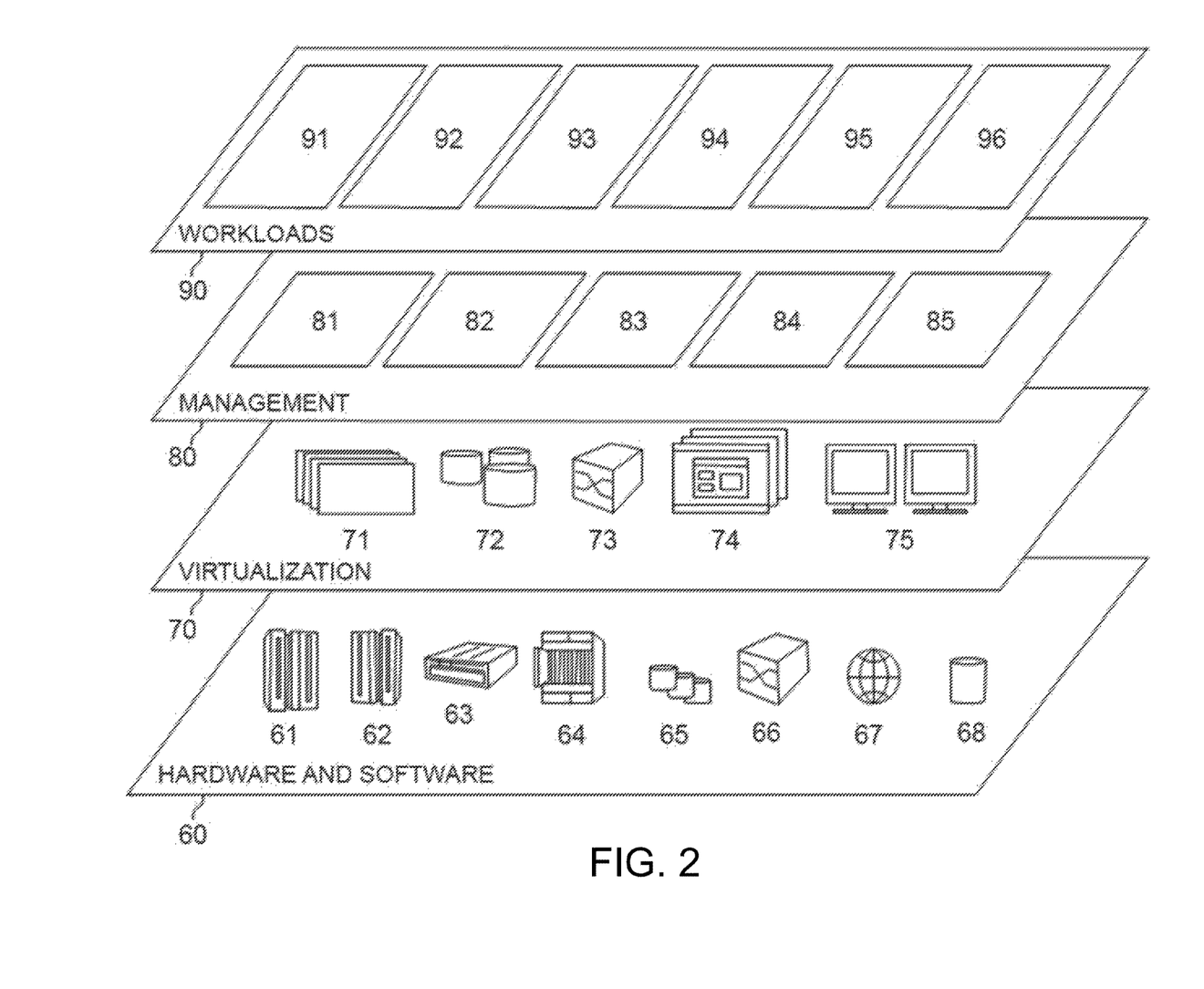
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for determining a container structure according to aspects of the present invention 96.

Figure 3:
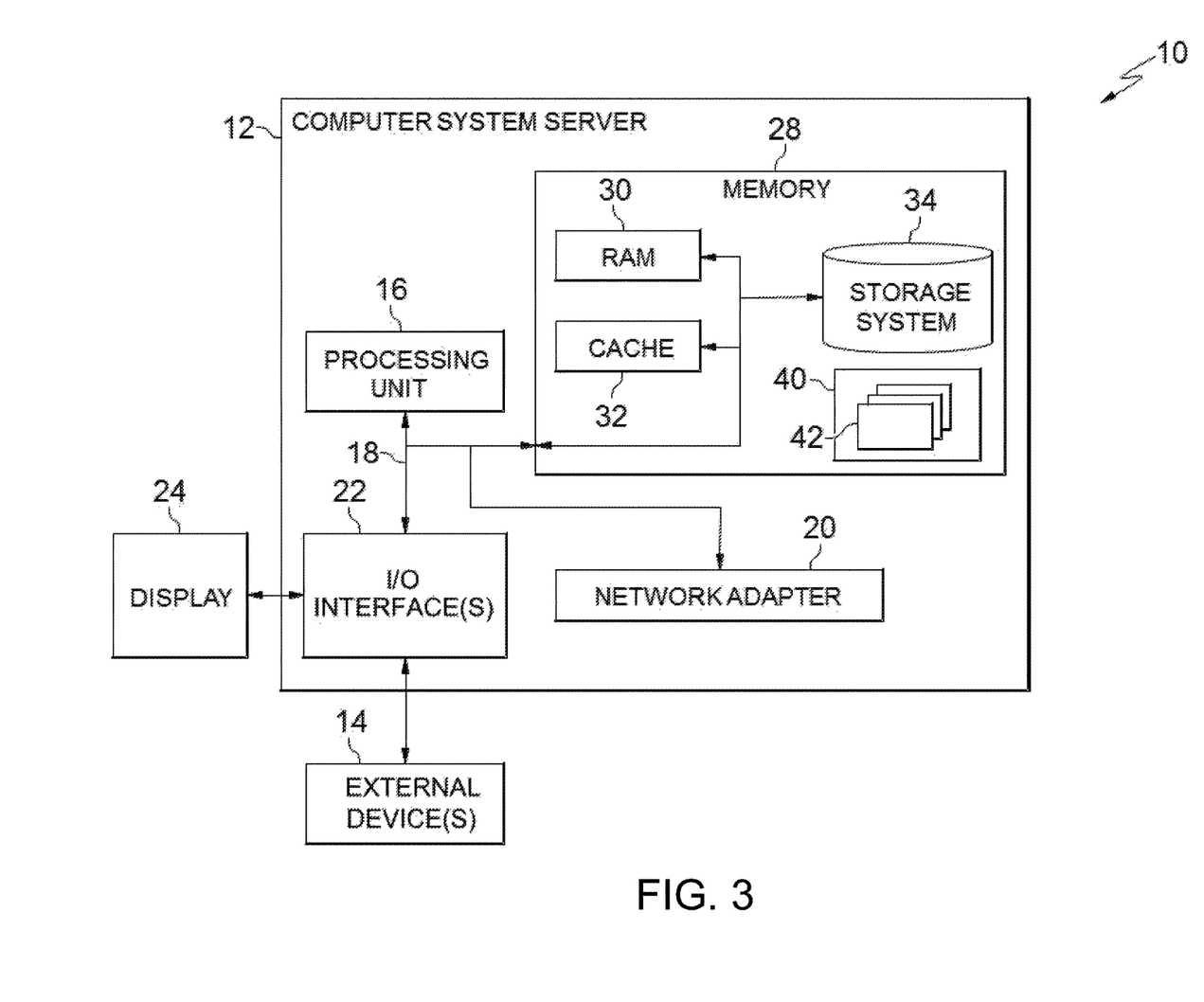
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Efficient orchestration and deployment of a container may present challenges. Generally, a user must predict the resource(s) required for the container. Typically, the user over-provisions the resources (to be on the safe side), and thereby incurs needless time and resource costs. However, if the resources are under-provisioned, the user may not be able to meet service level agreements (SLAs) for a given application.

Aspects of the present invention provide methods, processes, systems and articles that automatically determine and advise a consumer on how much resources are be required for their container to run a workload for a given application or service, as a function of information about other users using containers for similar (or related) applications/services.

Prior art approaches generally rely on manual trial and error, wherein a user defines a container size, monitors the usage, manually adjusts the size based on how the container is performing, and extrapolates using some linear/non-linear functions. Disadvantages include time inefficiencies, high error rates, and scope is limited by the knowledge of the user.

Using prior art automated tools (for example, server-sizing tools) is problematic, as such tools are designed to compute the size of hardware based on heuristics and formulae for well-known workloads, and accordingly the tools tend to be static and based on specific server model configurations, and are therefore inappropriate for sizing cloud resources (Virtual Machines, containers, etc.), when specific vendors and server models are not known.

Figure 4:
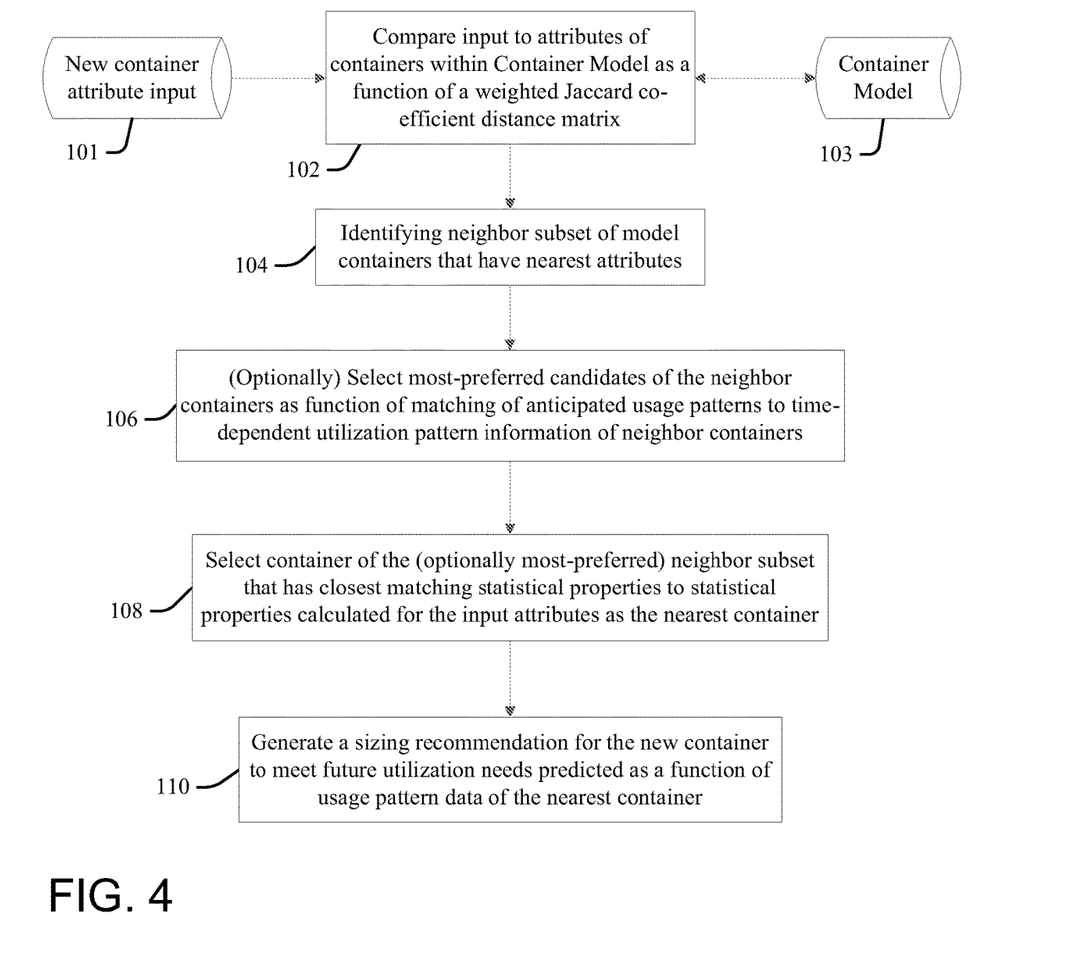
FIG. 4 is a flow chart illustration of an embodiment of the present invention.

FIG. 4 illustrates a method, process or system for generating a container structure according to the present invention. In response to a user input 101 of attributes of a new, desired container that include application, workload and usage characteristics, at 102 a processor configured according to an aspect of the present invention (the "configured processor") compares the input to attributes of each of plurality of existing containers within a container model 103, to identify at 104 one or more of the model containers that have attributes that are nearest to the input attributes as a function of a weighted Jaccard co-efficient distance matrix.

In an optional process (thus, in some but not all embodiments), at 106 the configured processor selects most-preferred candidates of the neighbor containers as function of matching of anticipated usage patterns to time-dependent utilization pattern information of neighbor containers. In some embodiments the configured processor displays the information identified with respect to the nearest neighbor subset container(s) that includes time-dependent utilization patterns (for example, yearly, monthly, weekly, etc.), enabling the user to visually match the anticipated usage pattern of the input data to one or more of the nearest neighbor containers and thereby manually select a subset of most-preferred candidates of the nearest containers.

At 108 the configured processor matches calculated statistical properties of the input attributes of the new container to statistical properties of the neighbor containers to select a nearest container (optionally as limited to a selection from the subset most-preferred candidates indicated at 104) as the container of the neighbor subset that has closest matching statistical properties to statistical properties calculated for the input attributes.

At 110 the configured processor generates a sizing recommendation for the new container that will meet future utilization needs predicted as a function of usage pattern data of the nearest container.

Figure 5:
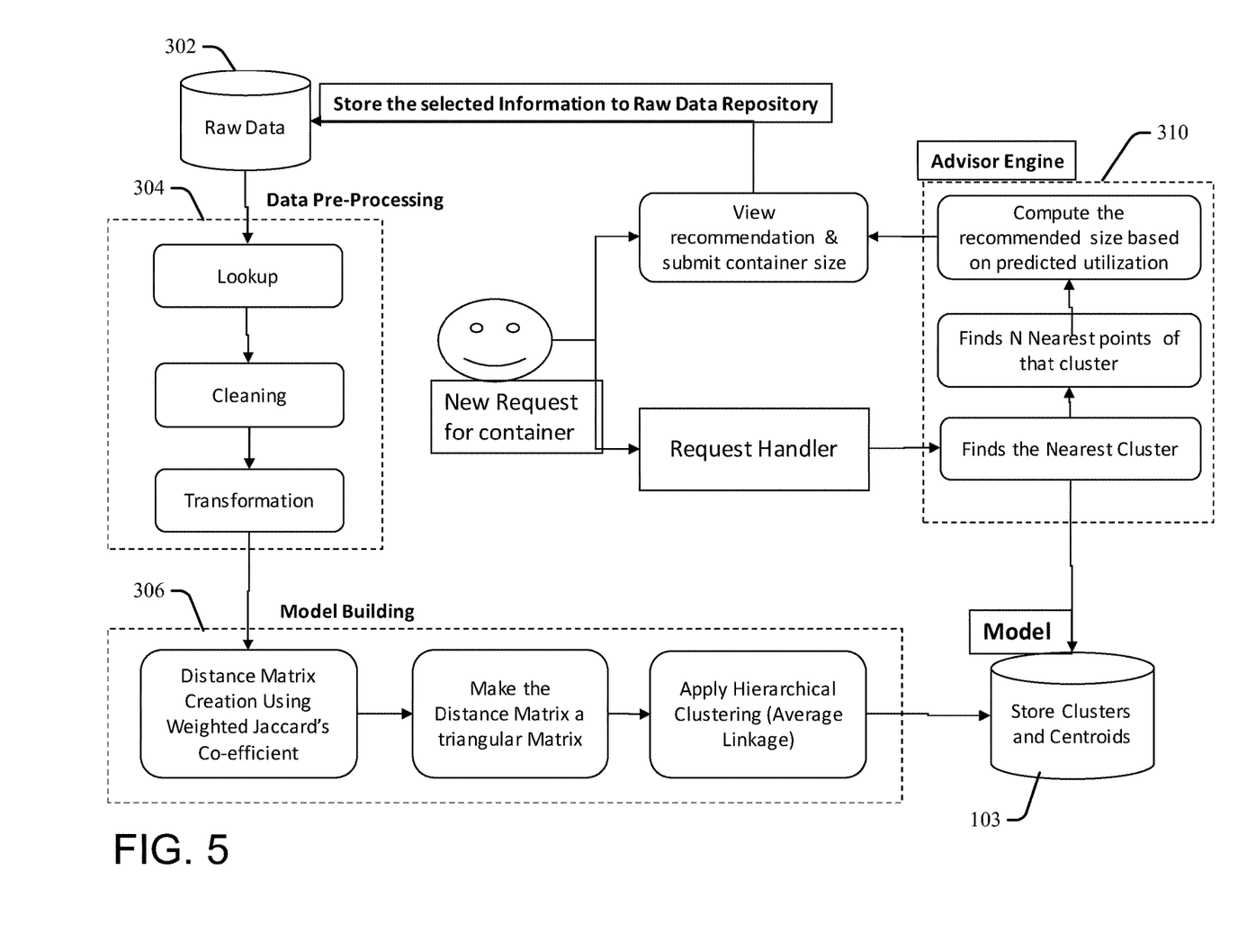
FIG. 5 is a block diagram illustration of an embodiment of the present invention.

FIG. 5 is a block diagram illustration of an embodiment of the present invention appropriate for practicing the process, method or system of FIG. 4. A user creating a new container utilizing embodiments of the present invention generally provides raw data inputs 302 satisfying the following illustrative but not limiting or exhaustive example description queries about the container (using a set of semantic tags):

How is the container is going to be used?
For what industry/application?
What kind of workload is going to run on the container?
What are the workload characteristics (usage volume, frequency of access, volume of data exchanged)?
Which environment is the container going to run (development, testing, staging, production, secondary/backup, etc.)?

In addition, aspects collect the following information about the container (used by the different users):

How are the containers or cluster of containers being used?
Levels of usage, temporal/seasonal patterns, rate of usage (for example, continuously increasing or decreasing, etc.)
What is the size of the containers or of a cluster of containers?
When/how often are the containers re-sized (up/down)?

Aspects use this and other historical data to build a model that groups containers that are similar based on the user-description (of the container) and the utilization characteristics, and wherein the model may account for partial information or noise in the provided data.

User provided feature data is generally categorical (for example, app type, workload type, environment, etc.), wherein container usage features are generally numerical (for example, average CPU usage, memory usage, container size, weekly CPU patterns, monthly storage patterns, etc.). Embodiments characterize/categorize the raw historical data 302 into categorical column data and row numerical data for matrix analysis, wherein the data columns include features of the container (for example, application ("app") type, workload, workload details, container usage patterns, etc.); and the row categories include input information about the new container and actual or anticipated container usage information (for example, container size, central processing unit (CPU) attributes, memory size and type, storage, weekly patterns, monthly patterns, etc.).

Aspects also account for deficiencies in the raw data 302: for example, some features may be absent in the raw-data (for example, user did not specify app-type, workload characteristics, etc.; or monitoring system failed to collect data). Some features may also be incorrect or invalid (for example, user provided incorrect information about workload, etc.).

Data Pre-Processing 304 assesses the raw data 302 column data (features) to determine whether there is variety in the data (for example, whether it follows a normal distribution), and whether the number of blank values is less than a threshold value (for example, 30%): if not, Data Pre-Processing 304 removes the feature/column from the raw-data 302.

Data Pre-Processing 304 also assesses the row data for each cluster of containers, to determine whether all the high-priority features are not blank; to determine whether the containers are actually being used (that CPU, memory & storage utilization data are in-line with the workload characteristics provided by the user); and that the data is being used for a minimum time-window (for example, determining if the cluster of containers is not being used, or it is being sparingly used, or is a newly created container). If any of these conditions are not met, then the row is removed from the raw-data 302.

Data Pre-Processing 304 also filter the row-data based on feedback from the users in the community. For example, if there is negative feedback about a certain container, then the row may be remove from the raw-data 302.

Data Pre-Processing 304 further transforms the input categorical data, provided by the user, into an internal representation, to ease computation.

Aspects of the present invention also create a distance matrix using a weighted Jaccard's Co-efficient in a Model Building process 306. More particularly, the aspects clusters points in an N-dimensional space using a distance function for categorical set of values, from a matrix input from the Data Pre-Processing 304: namely an M×M upper tri-angular matrix (namely UM) where M is the number of row of input matrix, generated from an input of cleaned and transformed raw data output by the Data Pre-Processing 304 (from input data including the raw column and row data described above)

In one example the configured processor creates a distance matrix using the following steps:

Step 1: For each container information, extract essential and comparable features (categorical features);
Step 2: For each pair of containers ("i" and "j"), calculate distance between them using a coefficient weightage function;
Step 3: determine a symmetric matrix (UM[i][j]) as equal to a distance between containers i and j;
Step 4: convert the symmetric matrix (UM) to a triangular matrix using a "lower upper" (LU) decomposition method;
Step 5: Return UM Aspects of the present invention may also use a co-efficient weightage function in the Model Building process 306: more particularly, a modified Jaccard's coefficients process that uses different weightage for different features (based on importance), wherein the distance is inversely proportionate to the similarity weightage.

Model building and storing at 308: To make the profile advisor efficient and fast at runtime, aspects of the present invention store the model output from the Model Building process 306 (i.e. some essential and pre-computed value) and use the stored model at runtime. The model is updated periodically and thereby learns through reinforcement.

From an input of the tri-angular matrix UM, the Model Building process 306 generates an optimized number of clusters as an output, with determined labelling and centroids, according to the following process:

Step 1: Apply Hierarchical clustering with average linkage on the matrix UM;

Step 2: For each cluster identify the points in that cluster;

Step 3: Centroid Calculation;

Step 3.1: For each cluster i feature j of centroid of the cluster is maximum occurrence of feature type j in that cluster (i.e. centroid[i] [j]=maximum occurrence of feature type j in cluster i);

Step 3.2: Store the centroids; and

Step 4: Store the labelled points.

An Advisor Engine 310 compares (processes) application information and container usage data as input to a model defined by centroid for each model cluster, and thereby generates as output a collection of N containers that are neighbors of the input container data, via the following steps:

Step 1: Calculate the distance from each centroid to the input-point (wherein an input-point is a tuple of application information and usage data);

Step 2: Select the points of cluster i, where the distance (centroid[i], input point) is a minimum;

Step 3: Calculate distance from each point of cluster i, to input-point;

Step 4: Collect N points from the cluster, where the distance(point$_i$[j], input-point) is minimum, and j belongs to the cluster i;

Step 5: For each point from Step 4, use the utilization data (past, present & future) to compute the recommended container size; and Step 6: Return a collection of N points from Step 5.

Aspects of the present invention determine similarity between containers described using categorical values (using a weighted Jaccard's co-efficient) and thereby control the distance between the points, as the maturity of the consumers improve. Initially, users tend to provide incorrect values for features (or tend to ignore certain features). Users tend to provide more accurate details about their containers over time, in part in response to getting used to the system and its business benefits. This capability enables the aspects to tune the distance function to be more accurate with recommendations.

Aspects of the present invention also rapidly narrow down recommendations to find a most-relevant cluster, based on the containers information provided by the users, and using the centroid point computed for the clusters (as the maximum occurrence of every feature in that cluster). Aspects further provide a hierarchical cluster among the N nearest neighbors, enabling a user to interactively and incrementally provide information about the containers while also getting recommendations generated by the Advisor Engine 310.

Users may also use aspects of the present invention to generate what-if analysis: by selecting different feature values, while determining/assessing the variabilities in the size of the containers in the hierarchical clusters.

Aspects of the present invention use historical utilization data from the existing containers to dynamically compute recommended container sizes that consider trends in usage patterns. For example, while recommending size of the container for a banking application in the month of March (financial year end), the utilization data of the reference/recommended container in the months of February, March & April (configurable by user) is used to compute the size required for the container (to handle the expected increase in workload).

The ability to right-size a container offers advantages in helping users to make quick, data-driven decisions, with a high degree of confidence. In the absence of this capability, a user will tend to over-provision the resources for a container, experiencing unnecessarily high resource costs; or under-provision the resources leading, to SLA breaches that affect customer satisfaction.

Aspects of the present invention may be provided as a service to cloud brokers, who can help users right-size cloud runtimes (containers or virtual machines) for an entire solution of pattern, including of multiple containers. Aspects may also help users plan their migration from one provider to another.

The terminology used herein is for describing aspects only and is not intended to be limiting of the invention, or as to application of usage of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a container structure, the method comprising executing on a computer processor:

in response to an input of attributes of a new container that comprises application, workload and usage characteristics, comparing the input to attributes of each of plurality of existing containers within a container model as a function of a weighted Jaccard co-efficient distance matrix;

identifying a neighbor subset of the model containers that each have attributes that are nearest to the input attributes, relative to remaining others of the model containers;

selecting, as a nearest container, a container of the neighbor subset that has closest matching statistical properties to statistical properties calculated for the input attributes, relative to remaining others of the neighbor subset; and generating a sizing recommendation for the new container to meet future utilization needs predicted as a function of usage pattern data of the nearest container.

2. The method of claim 1, further comprising:

selecting most-preferred candidates of the neighbor containers as function of matching of anticipated usage patterns to time-dependent utilization pattern information of the neighbor containers; and limiting container candidates for selecting as the nearest container to containers within the most-preferred candidates.

3. The method of claim 1, further comprising:

integrating computer-readable program code into a computer system comprising a processor, a computer-readable memory in circuit communication with the processor, and a computer-readable storage medium in circuit communication with the processor; and wherein the processor executes program code instructions stored on the computer-readable storage medium via the computer-readable memory and thereby performs the comparing the input to attributes of the each of plurality of existing containers within the container model as the function of the weighted Jaccard co-efficient distance matrix, the identifying the neighbor subset of the model, the selecting the nearest container, and the generating the sizing recommendation for the new container to meet the future utilization needs predicted as the function of usage pattern data of the nearest container.

4. The method of claim 3, wherein the computer-readable program code is provided as a service in a cloud environment.

5. The method of claim 1, wherein the comparing the input attributes to the attributes of each of plurality of existing containers within the container model as the function of the weighted Jaccard co-efficient distance matrix comprises:

categorizing the attributes of the new container input into column categorical data and row numerical data for matrix analysis;

wherein the column categorical data is selected from the group consisting of application type, workload, workload details and container usage patterns; and wherein the row numerical data is selected from the group consisting of container size, central processing unit attributes, memory size, memory type, and time period usage pattern data.

6. The method of claim 5, wherein the comparing the input attributes to the attributes of each of plurality of existing containers within the container model as the function of the weighted Jaccard co-efficient distance matrix comprises:

extracting comparable categorical features from container information of each of the model containers;

for each of a plurality of pairings of the new container to different ones of the model containers, calculating respective distance between respective extracted comparable categorical features to the column categorical data of the new container as a function of a coefficient weightage function;

generating a symmetric distance matrix from the respective calculated distances; and converting the symmetric matrix into a triangular matrix using a lower upper decomposition method.

7. The method of claim 5, wherein the comparing the input attributes to the attributes of each of plurality of existing containers within the container model as the function of the weighted Jaccard co-efficient distance matrix comprises:

using a modified Jaccard coefficients process that uses different weightage for different features based on importance, wherein distance is inversely proportional to a similarity weightage.

8. The method of claim 5, further comprising:

prior to the comparing the input attributes to the attributes of each of plurality of existing containers within the container model as the function of the weighted Jaccard co-efficient distance matrix, removing first row data from each of the model containers in response to a determination that is selected from the group consisting of determining that a high-priority feature within the first row data is blank, and determining that the first row data is not being used for a minimum threshold time.

9. A system, comprising:

a processor;

a computer-readable memory in circuit communication with the processor; and a computer-readable storage medium in circuit communication with the processor;

wherein the processor executes program instructions stored on the computer-readable storage medium via the computer-readable memory and thereby:

in response to an input of attributes of a new container that comprises application, workload and usage characteristics, compares the input to attributes of each of plurality of existing containers within a container model as a function of a weighted Jaccard co-efficient distance matrix;

identifies a neighbor subset of the model containers that each have attributes that are nearest to the input attributes, relative to remaining others of the model containers;

selects, as a nearest container, a container of the neighbor subset that has closest matching statistical properties to statistical properties calculated for the input attributes, relative to remaining others of the neighbor subset; and generates a sizing recommendation for the new container to meet future utilization needs predicted as a function of usage pattern data of the nearest container.

10. The system of claim 9, wherein the processor executes the program instructions stored on the computer-readable storage medium via the computer-readable memory and thereby:

selects most-preferred candidates of the neighbor containers as function of matching of anticipated usage patterns to time-dependent utilization pattern information of the neighbor containers; and limits container candidates for selecting as the nearest container to containers within the most-preferred candidates.

11. The system of claim 9, wherein the processor executes the program instructions stored on the computer-readable storage medium via the computer-readable memory and thereby compares the input attributes to the attributes of each of plurality of existing containers within the container model as the function of the weighted Jaccard co-efficient distance matrix by:
- categorizing the attributes of the new container input into column categorical data and row numerical data for matrix analysis;
- wherein the column categorical data is selected from the group consisting of application type, workload, workload details and container usage patterns; and
- wherein the row numerical data is selected from the group consisting of container size, central processing unit attributes, memory size, memory type, and time period usage pattern data.

12. The system of claim 11, wherein the processor executes the program instructions stored on the computer-readable storage medium via the computer-readable memory and thereby compares the input attributes to the attributes of each of plurality of existing containers within the container model as the function of the weighted Jaccard co-efficient distance matrix by:
- extracting comparable categorical features from container information of each of the model containers;
- for each of a plurality of pairings of the new container to different ones of the model containers, calculating respective distance between respective extracted comparable categorical features to the column categorical data of the new container as a function of a coefficient weightage function;
- generating a symmetric distance matrix from the respective calculated distances; and
- converting the symmetric matrix into a triangular matrix using a lower upper decomposition method.

13. The system of claim 11, wherein the processor executes the program instructions stored on the computer-readable storage medium via the computer-readable memory and thereby compares the input attributes to the attributes of each of plurality of existing containers within the container model as the function of the weighted Jaccard co-efficient distance matrix by:
- using a modified Jaccard coefficients process that uses different weightage for different features based on importance, wherein distance is inversely proportionate to a similarity weightage.

14. The system of claim 11, wherein the processor executes the program instructions stored on the computer-readable storage medium via the computer-readable memory and thereby:
- prior to comparing the input attributes to the attributes of each of plurality of existing containers within the container model as the function of the weighted Jaccard co-efficient distance matrix, removes first row data from each of the model containers in response to a determination that is selected from the group consisting of determining that a high-priority feature within the first row data is blank, and determining that the first row data is not being used for a minimum threshold time.

15. A computer program product for a virtual machine structure, the computer program product comprising:
- a computer-readable storage medium having computer-readable program code embodied therewith, wherein the computer-readable storage medium is not a transitory signal per se, the computer-readable program code comprising instructions for execution by a processor that cause the processor to:
  - in response to an input of attributes of a new container that comprises application, workload and usage characteristics, compare the input to attributes of each of plurality of existing containers within a container model as a function of a weighted Jaccard co-efficient distance matrix;
  - identify a neighbor subset of the model containers that each have attributes that are nearest to the input attributes, relative to remaining others of the model containers;
  - select, as a nearest container, a container of the neighbor subset that has closest matching statistical properties to statistical properties calculated for the input attributes, relative to remaining others of the neighbor subset; and
  - generate a sizing recommendation for the new container to meet future utilization needs predicted as a function of usage pattern data of the nearest container.

16. The computer program product of claim 15, wherein the computer-readable program code instructions for execution by the processor further cause the processor to:
- select most-preferred candidates of the neighbor containers as function of matching of anticipated usage patterns to time-dependent utilization pattern information of the neighbor containers; and
- limit container candidates for selecting as the nearest container to containers within the most-preferred candidates.

17. The computer program product of claim 16, wherein the computer-readable program code instructions for execution by the processor further cause the processor to compare the input attributes to the attributes of each of plurality of existing containers within the container model as the function of the weighted Jaccard co-efficient distance matrix by:
- categorizing the attributes of the new container input into column categorical data and row numerical data for matrix analysis;
- wherein the column categorical data is selected from the group consisting of application type, workload, workload details and container usage patterns; and
- wherein the row numerical data is selected from the group consisting of container size, central processing unit attributes, memory size, memory type, and time period usage pattern data.

18. The computer program product of claim 16, wherein the computer-readable program code instructions for execution by the processor further cause the processor to compare the input attributes to the attributes of each of plurality of existing containers within the container model as the function of the weighted Jaccard co-efficient distance matrix by:
- extracting comparable categorical features from container information of each of the model containers;
- for each of a plurality of pairings of the new container to different ones of the model containers, calculating respective distance between respective extracted comparable categorical features to the column categorical data of the new container as a function of a coefficient weightage function;
- generating a symmetric distance matrix from the respective calculated distances; and
- converting the symmetric matrix into a triangular matrix using a lower upper decomposition method.

19. The computer program product of claim 16, wherein the computer-readable program code instructions for execution by the processor further cause the processor to compare the input attributes to the attributes of each of plurality of existing containers within the container model as the function of the weighted Jaccard co-efficient distance matrix by:
using a modified Jaccard coefficients process that uses different weightage for different features based on importance, wherein distance is inversely proportionate to a similarity weightage.

20. The computer program product of claim 16, wherein the computer-readable program code instructions for execution by the processor further cause the processor to:
prior to comparing the input attributes to the attributes of each of plurality of existing containers within the container model as the function of the weighted Jaccard co-efficient distance matrix, remove first row data from each of the model containers in response to a determination that is selected from the group consisting of determining that a high-priority feature within the first row data is blank, and determining that the first row data is not being used for a minimum threshold time.

* * * * *

UNITED STATES PATENT AND TRADEMARK OFFICE
CERTIFICATE OF CORRECTION

PATENT NO. : 10,740,362 B2
APPLICATION NO. : 15/851808
DATED : August 11, 2020
INVENTOR(S) : Agrawal et al.

Page 1 of 1

It is certified that error appears in the above-identified patent and that said Letters Patent is hereby corrected as shown below:

On the Title Page

Item (72), Fourth inventor's Name reads "Pothuraju Srinivas" should read --Srinivas Pothuraju--.

Signed and Sealed this
Fifth Day of January, 2021

Andrei Iancu
*Director of the United States Patent and Trademark Office*